United States Patent [19]
Fischer

[11] Patent Number: 5,300,225
[45] Date of Patent: Apr. 5, 1994

[54] VACUUM CLEANED MICRO-STRAINER SYSTEM

[76] Inventor: Harry C. Fischer, Box 14, Moon, Va. 23119

[21] Appl. No.: 961,107

[22] Filed: Oct. 15, 1992

[51] Int. Cl.$^5$ .................... B01D 33/00; B01D 33/044
[52] U.S. Cl. .................... 210/391; 210/402; 210/416.1; 210/472; 210/490
[58] Field of Search ............... 210/402, 403, 404, 407, 210/408, 409, 416.1, 472, 391, 490; 417/435

[56] References Cited

U.S. PATENT DOCUMENTS

| | | | |
|---|---|---|---|
| 899,961 | 9/1908 | Edgerton | 210/404 |
| 1,914,742 | 6/1933 | Hillier | 210/404 |
| 2,134,703 | 11/1938 | Cobb | 210/404 |
| 3,591,316 | 7/1971 | Piccirilli | 417/435 |
| 3,797,662 | 3/1974 | Titus | 210/403 |
| 4,038,187 | 7/1977 | Saffran | 210/108 |
| 4,142,976 | 3/1979 | Browne | 210/404 |
| 4,248,709 | 2/1981 | Irving | 210/403 |
| 4,454,042 | 6/1984 | Dorcheus | 210/402 |
| 4,515,693 | 5/1985 | Luthi | 210/402 |
| 4,702,845 | 10/1987 | Wykoff | 210/784 |
| 4,772,398 | 9/1988 | Sando et al. | 210/703 |
| 4,995,980 | 2/1991 | Jaubert | 210/602 |
| 5,008,007 | 4/1991 | Anderson | 210/111 |
| 5,021,126 | 6/1991 | Gwin et al. | 210/402 |
| 5,213,685 | 5/1993 | Padovan | 210/402 |

*Primary Examiner*—Peter A. Hruskoci
*Assistant Examiner*—Robert James Popovics
*Attorney, Agent, or Firm*—Raymond L. Greene

[57] ABSTRACT

A vacuum cleaned micro-strainer is provided. The apparatus uses a rotating cylinder-shaped set of filtering screens through which waste water flows. A vacuum head centered above the cylindrical screen assembly sucks particulate matter from the screens. The micro-strainer is constructed of inexpensive, corrosion resistant, lightweight materials which minimize replacement and maintenance. The invention offers a cost-effective means for filtration of particulate matter from water generated by fish culture systems, cooling tower systems and waste water treatment systems while minimizing the collection of water.

14 Claims, 7 Drawing Sheets

5,300,225

VACUUM CLEANED MICRO-STRAINER SYSTEM

BACKGROUND OF THE INVENTION

1. Field of the Invention

This invention relates to filtration of solids from water and more particularly to filter systems for fish culture tanks.

2. Description of the Related Art

In the culture of fish in small quantities, such as in aquarium culture, solid wastes are removed by capturing the solids in filters that must be cleaned by hand after they have become loaded with solids. Although labor intensive, this method is the preferred for small culture systems.

In large outdoor fish farms, such as catfish farms, the solids collect on the bottoms of ponds and are removed once per year after the fish have been harvested. This process results in all of the water in the pond being discarded (approximately 1–5 million gallons) and requires that new water be supplied before new fish can be added to the pond. The pond draining, drying, and refilling process can take as much as a month to accomplish.

Where fish are grown in raceways, such as in trout farms, solids are collected in areas near the end of the raceways and drained off to settling ponds. These ponds may be as large as one quarter the area of the raceways. These settling ponds must also be drained and cleaned by hand once or twice per year.

In Europe where Atlantic salmon are grown, some hatcheries are indoors using heated water for optimum growth. As settling ponds are too large to be placed indoors, a form of mechanical micro-strainer is used to remove solids. The fine screens used are cleaned by jets of high pressure water applied to the clean side of the screen which removes the solids but adds water. The ratio of water-in to water-out is about 100:1 and with a water flow of 24,000 gallons in per hour, the solids-rich waste water generated in this method typically amounts to 240 gallons. This solids-rich waste water cannot be discharged to a stream but must be collected and stored to be treated later by yet another process.

In a typical commercial fish growing operation, fish are stocked at about one pound per gallon of water. In a system containing 12,000 gallons of water, 12,000 pounds of fish can be fed three percent of body weight per day or 360 pounds per day or 30 pounds per hour dry weight. The wet weight of feces and uneaten food is about equal to the dry weight of food fed.

Efforts to avoid the generation of large quantities of waste-laden liquid during the cleaning process have been generally unsatisfactory in the fish farming industry. However, in an unrelated art area, U.S. Pat. No. 4,772,398 dated Sep. 20, 1988 shows a means of removing textile fibers from a stream of water containing fibers that have been concentrated by aeration of the incoming stream. The fibers are concentrated and are picked up by the belt and vacuumed off the belt and recovered.

The inapplicability of this scheme shown in the '398 patent to the fish farming tanks is evident in the patent's use of a belt as a waste pick-up. In fish farming operations, waste must be filtered out by a flow-through system thereby allowing removal of much smaller particles and also allowing particle removal at lower concentrations of waste per volume of liquid.

SUMMARY OF THE INVENTION

An object of the invention is to provide a microstrainer system which will remove solids from the water in which fish are growing.

Another object of the invention is to remove the solids using the minimum amount of water.

A further object is to make the removal of the solids automatic so that the minimum amount of labor is required by the operator.

A still further object is to construct the filter of inexpensive, corrosion resistant, lightweight materials such as plastics so as to minimize replacement, maintenance and shipping costs.

It is yet another object of the invention to provide a micro-strainer system having individual micro-strainers which can serve several different species of fish.

The invention is a vacuum-cleaned micro-strainer system having a rotating element with a cylindrical strainer middle section and conical end sections. Fluid to be strained flows into the interior of the rotating element accumulating solid waste on the exterior of the cylindrical strainer section. The rotating element is canted and partially submerged in the solid-laden liquid. As the element rotates, the accumulated waste is lifted out of the liquid where it is then vacuumed from the outside of the strainer by a wet-vac system. Filtered fluid flows out the lower conical end or may be pumped out through the upper conical end.

BRIEF DESCRIPTION OF THE DRAWINGS

The invention together with further objects and advantages thereof, may be more fully understood by reference to the following detailed description taken in conjunction with the accompanying drawings in which.

DETAILED DESCRIPTION OF THE INVENTION

Figure 1:
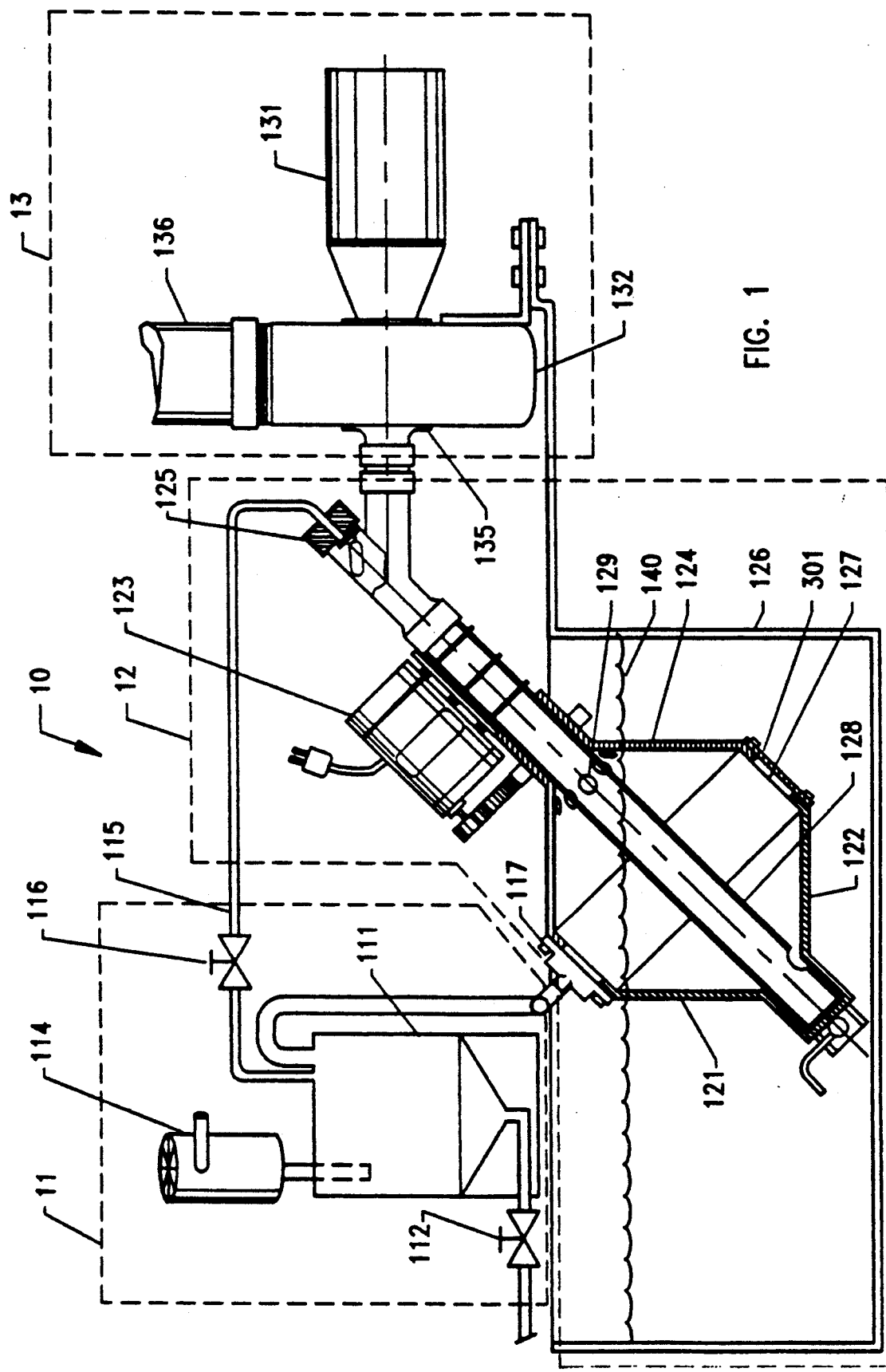
FIG. 1 is a schematic view of the overall system showing the microstrainer system positioned in a tank.

Referring now to FIG. 1, the overall microstrainer system, designated generally by the reference numeral 10, is shown with its major components. The system 10 comprises a vacuum section 11, a filtration section 12, and a clarified liquid removal section 13.

Vacuum section 11 includes a separation tank 111 having a sediment drain 112. An electrically-driven vacuum pump unit 114 provides a vacuum for operation of the vacuum head 117 and pump-priming line 115. A manual valve 116 is provided for manual shut-off of priming operations if needed.

Clarified liquid removal section 13 comprises an electric motor 131 and a non self-priming pump 132. Clarified liquid enters the non self-priming pump 132 through inlet 135 and is discharged through discharge line 136.

Filtration section 12 comprises the rotating filter body assembly 121 immersed in tank 126, the electric motor and drive assembly 123, and the pump priming assembly 125. The rotating filter body assembly 121 is constructed of a solid lower conical section 122 and a vented upper conical section 124 attached to a center cylindrical section 127. Upper conical section 124 has a plurality of vent holes 129 located around the upper circumference of the section positioned above the liquid operating level 140. Center cylindrical section 127 contains the microstrainer assembly 301 further described in FIG. 3. The rotating filter body assembly 121 rotates around fixed drain pipe 128.

Figure 2:
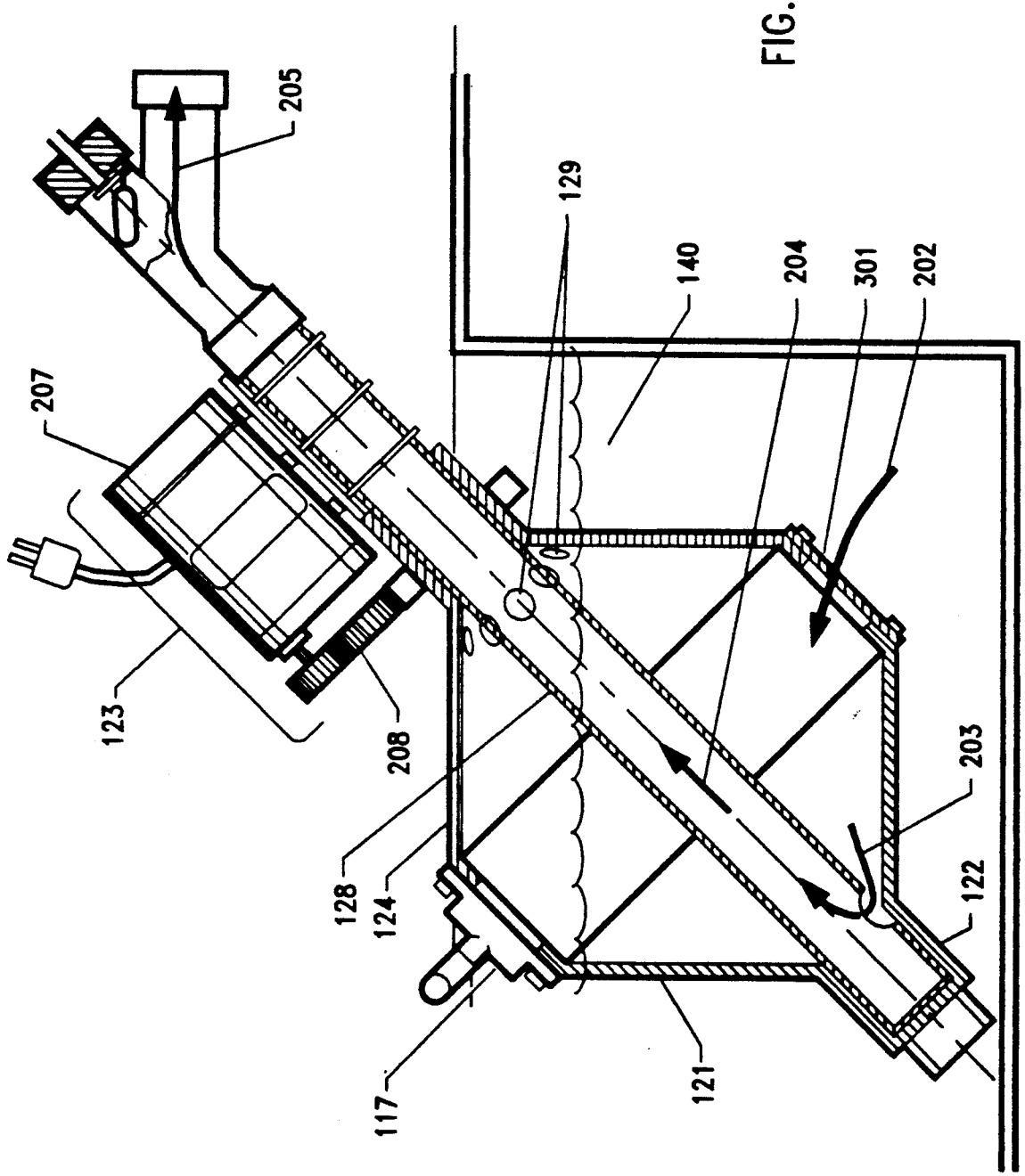
FIG. 2 is a cross sectional view of the rotating filter body and drive assembly.

Referring now to FIG. 2, operation of the microstrainer system is shown by liquid flow arrows. Particulate-laden liquid flows into the rotating filter body 121 as shown by arrow 202 passing through microstrainer assembly 301. The clarified liquid then flows along the lower conical section 122 and into and through drain pipe 128 as shown by arrow 203. Rotating filter body 121 is driven by electric motor and drive assembly 123 comprising an electric motor 207 driving a cog-belt 208 which in turn drives filter body 121. The low rate of rotation and minimal load allows a simple rotating joint at the interface of upper conical section 124. Likewise, a rotating joint at the interface of the lower conical section 122 and drain pipe 128 is a simple rotating joint. Neither joint requires any special sealing.

At the upper portion of the upper conical section 124, vent holes 129 provide pressure relief allowing air to flow to vacuum head 117. As the filter body rotates, filtered particulate matter is collected on the outer surface of the microstrainer assembly 301 and slowly rotated above the liquid operating level 140. Vacuum head 117 cleans the particulate matter from the microstrainer assembly 301 while collecting a minimal amount of liquid.

Figure 3:
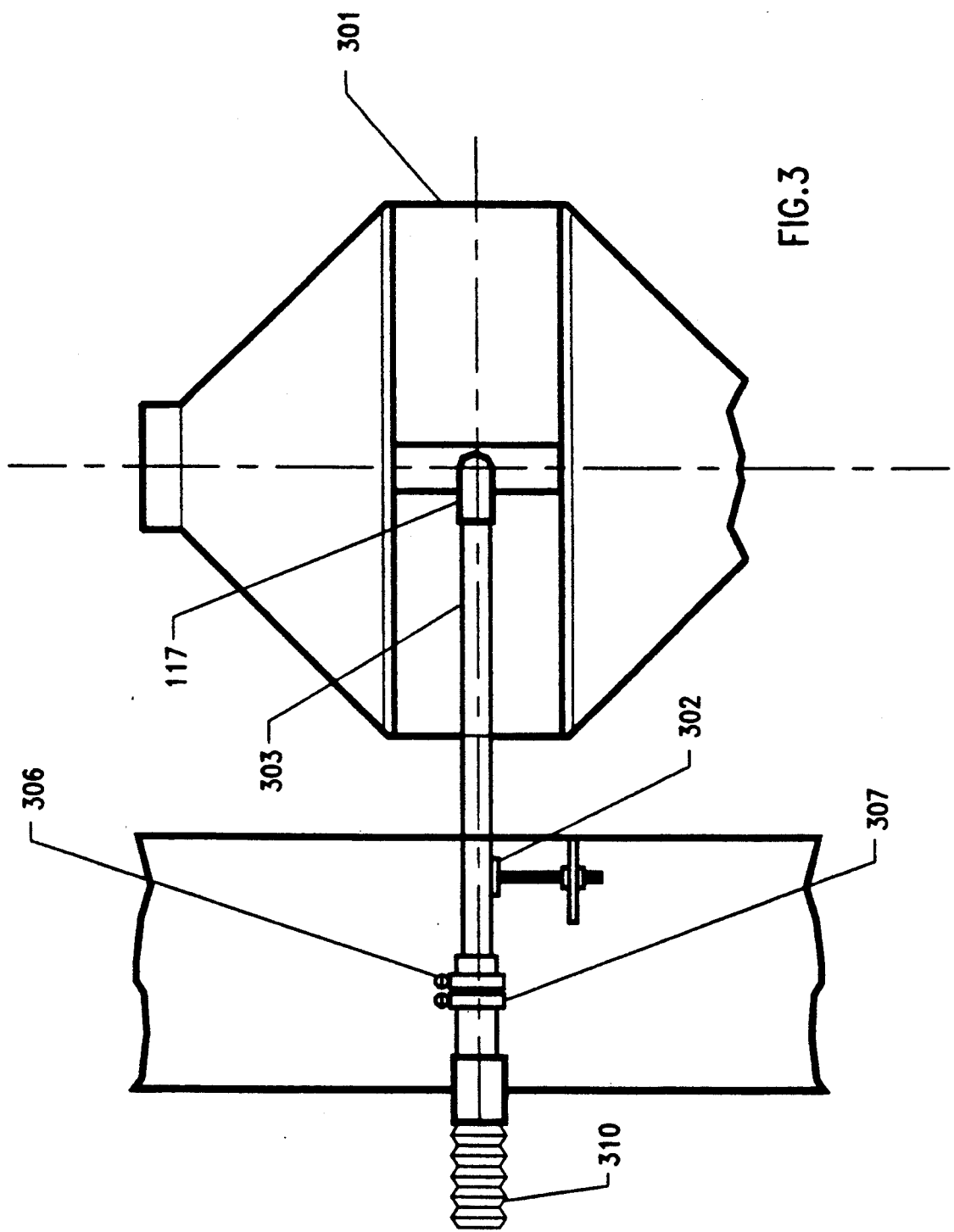
FIG. 3 is a top view showing the vacuum head with positioning adjustments.

FIG. 3 shows a top view of the vacuum head 117 with the adjusting mechanism which centers the vacuum head over the active filter area. An adjustable support 302 provides lateral adjustment of the vacuum tube 303 while allowing free floating vertical travel. The weight of the vacuum head 117 provides the necessary downward pressure to maintain contact with microstrainer assembly 301, elevation swivel 306 and centering clamp 307, vacuum hose 310 and allow rotational adjustment for vacuum head 117.

Figure 4:
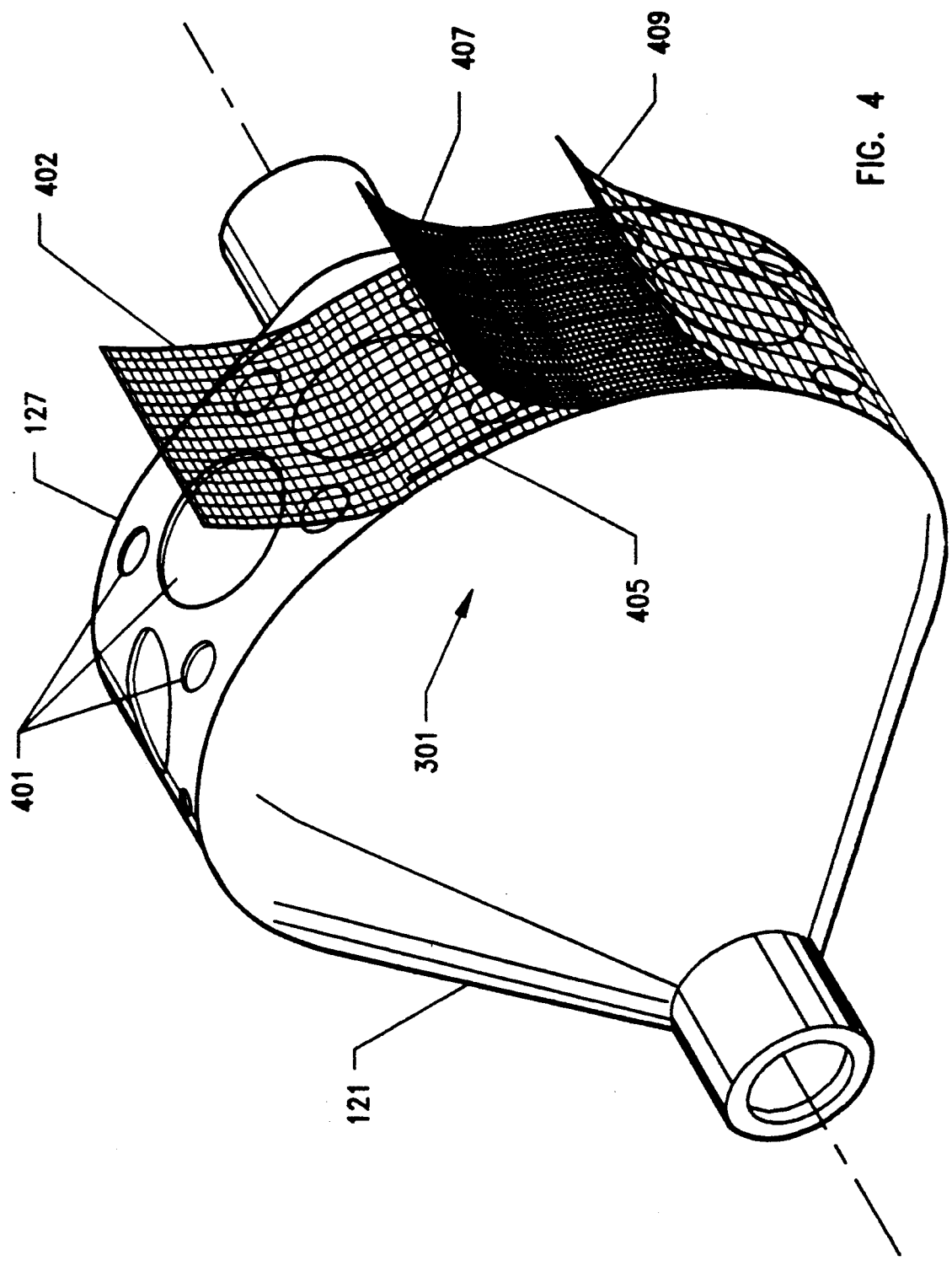
FIG. 4 is a perspective view of the rotating filter body showing the cylindrical strainer section lay-up.

FIG. 4 is a perspective view of the microstrainer assembly, designated generally by reference number 301, showing the filter assembly lay up. The center cylindrical section 127 of the filter body 121 between the two 45° funnels has a plurality of holes 401 cut into its surface so that 70 percent of the area is open. Over the entire surface is fastened a coarse mesh stainless steel screen 402. This screen is held in position by stainless steel screws (not shown) located at intervals around both sides of the screen. A caulking compound 405 of RTV silicone is applied between the wires of the screen near the outside edge to prevent particulate matter flow around the strainer edges. A fine filter screen cloth 407 is applied as the second layer. This fine cloth performs the removal of minute particulate matter. In the preferred embodiment, depending on application, the cloth is as coarse as 50 mesh to as fine as 300 mesh. Because the vacuum head draws the fine cloth against the surface of the vacuum head thereby causing rapid wear, it is necessary to provide a sliding surface for the vacuum head. That surface is provided by a guard screen 409. Guard screen 409 comprises an overlay screen with 70 percent open area and thickness of about 0.045 inches. The guard screen is made of high density polyethylene providing a low friction sliding surface for the vacuum head and thereby eliminating the wear on the fine cloth 407. The guard screen 409 can be removed and replaced since it is attached by any conventional fasteners and does not require caulking.

The characteristics of fish waste are such that a fine screen will clog in a few seconds with soft, gelatinized fish waste. However, by speeding up the rotating of the filter body, the capacity of the system can almost be increased to the capacity of the vacuum cleaning head. A 6 rpm motor more than doubles the capacity of the filter compared to using a 2 rpm motor. When one considers that at 6 rpm the velocity of the screen beneath the vacuum head on an early model was only 6 inches per second, higher speeds can increase the capacity further.

Although this filter was designed for removal of fish waste from recirculated water with the minimum loss of water, there are many other industries that face the same problem due to environmental restrictions on discharge of wastes into streams and even sewers. The materials chosen are compatible with both fresh and salt water and are lightweight. The filter body is rotomolded polyethylene and the vacuum head is PVC. The bearing formed by the outlet fitting and the polyethylene filter body is water lubricated and has shown excellent wear resistance.

Figure 5:
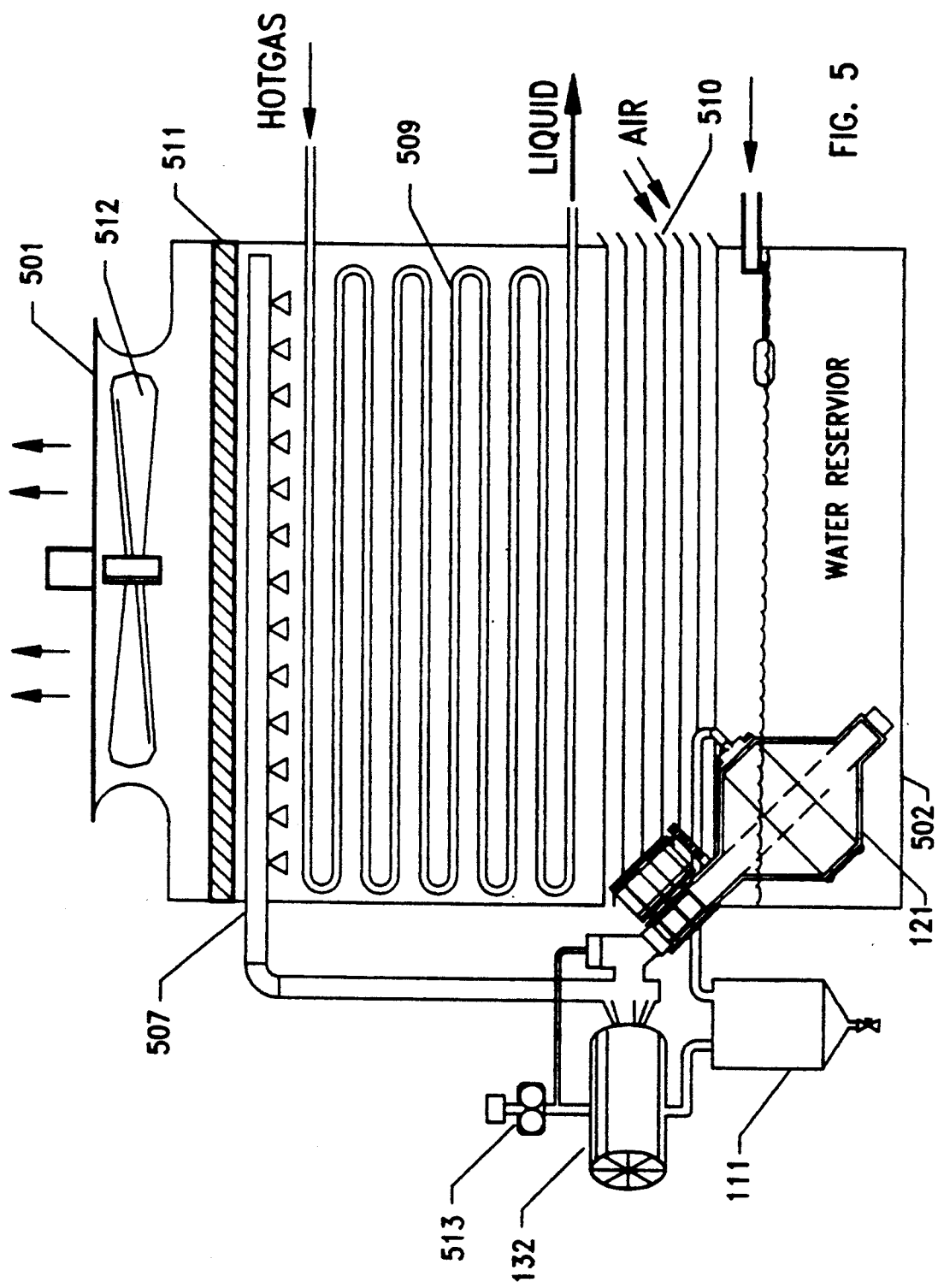
FIG. 5 illustrates the microstrainer system adaptation for removal of particulates from cooling towers and evaporative condensers.

FIG. 5 shows the vacuum cleaned micro-strainer cleaning the water in an evaporative condenser 501 used in the refrigeration and air conditioning industry. The rotating filter body 121 is immersed in basin 502. Pump 132 delivers filtered water to header 507 where water sprays over coils 509. Air containing dirt flows through louvers 510 up over the coils 509 and flows past mist eliminators 511 and is discharged upward by axial fan 512. Particulates include dust, bacteria, and chemical solids which are deposited in separation tank 111. Vacuum pump 513 keeps the pump primed and removes solids with a minimum loss of water. Solids can be discharged into the sewer where allowed or collected and transported to a landfill or other liquid disposal means.

Figure 6:
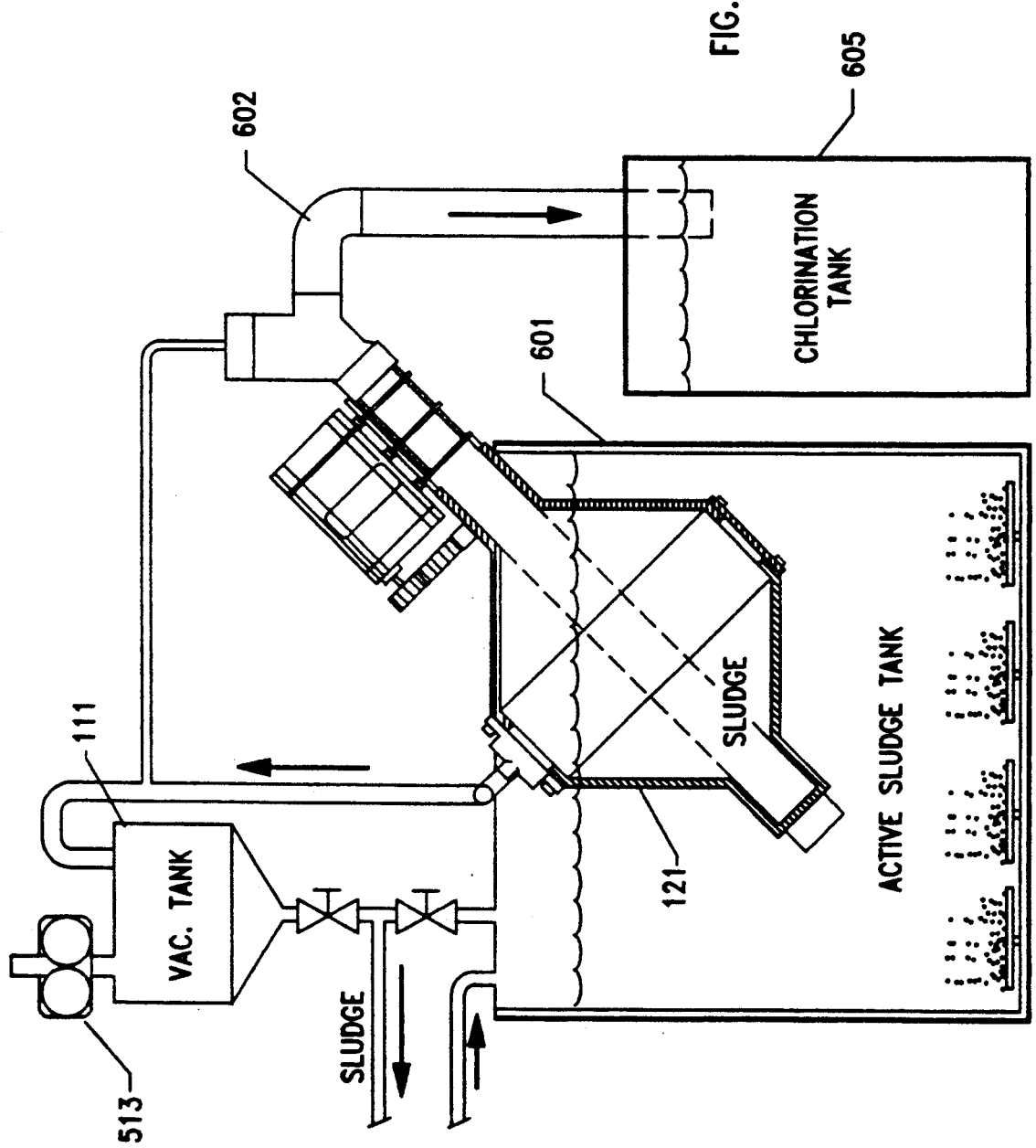
FIG. 6 shows the microstrainer system adaptation for removal of suspended solids in sewage treatment plants where the filtrate is syphoned from the aerated tanks.

FIG. 6 illustrates how treated waste water can have solids removed without use of chemical flocculants. The aerated activated sludge tanks 601 has rotating filter body 121 immersed in activated sludge tanks. Treated water flows from filter body 121 through syphon 602 to chlorination tank 605 before discharge. The vacuum removed sludge is collected in separation tank 111. As previously described, vacuum pump 513 keeps the syphon primed and removes the solids from the outside of the filter screen with the minimum amount of water loss. The concentrated sludge can be dried and disposed of in an environmentally safe manner.

Figure 7:
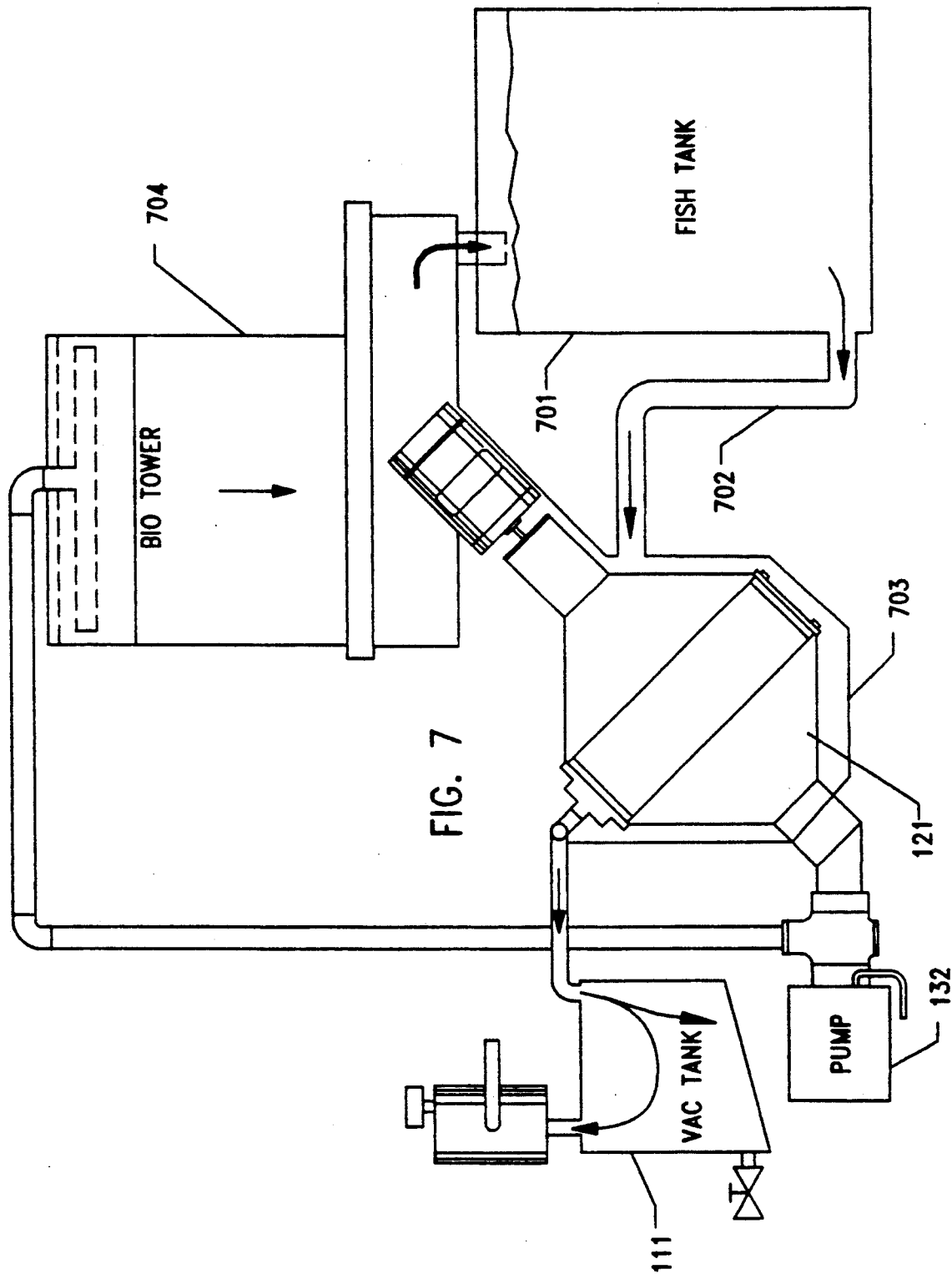
FIG. 7 shows the microstrainer system adaptation for a fish culture system where the filtrate flows by gravity to a recirculating pump.

FIG. 7 illustrates the use of the filter in a fish culture system for which it was originally designed. The rotating filter body 121 is positioned in a tank 703 into which particulate laden water flows from fish tanks 701 through pipe 702 where it passes through rot filter body 121. The filtrate flows by gravity to pump 132 from which it is pumped to a bio-reactor, $CO_2$ stripper, oxygenator, and foam fractionator 704 and then returns the fish tanks. The fish waste is collected in separation tank 111 where solids and liquids are collected while the air is removed by the vacuum pump and discharged back to atmospheric pressure.

The advantages and benefits of the invention are numerous. In this microstrainer system, the ratio of incoming water to waste water is 6000:1, sufficiently low in water content so that the waste can be dried or applied to crops as fertilizer. Instead of using jets of high pressure water which are applied to the clean side of the screen to remove solids, a vacuum is applied to the dirty side of the screen and the solids are removed by a stream of air drawn through the screen from the clean side to the dirty side. The solids are carried by the vacuum air to a separation tank where the solids with only a small amount of water drop out of the air stream to be collected while the air is exhausted through the vacuum pump back to the atmosphere. When there are no solids to be collected, the only amount of water required to wet the screen is removed. In the preferred embodiment, this quantity is about 0.32 gallons per square foot per hour. The amount of dirty water processed per hour is about 12,000 gallons, which is a ratio of 37,000:1.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. An apparatus for continuous removal of particulate matter from liquids comprising:
    a canted rotating drum assembly, formed by a one-piece rotomolded plastic body having a first conical end, a cylindrical center section having a plurality of openings therein, and a second conical end partially submerged in a particulate-laden liquid;
    means for filtering attached to said rotating drum, said filtering means admitting a particle laden liquid to said inside of the rotating drum assembly and collecting particulate matter on the outside of the filtering means;
    means for removing particulate matter from said means for filtering, said means for removing particulate matter comprising a means for gene vacuum-induced air flow through said filtering means; and
    means for extracting the filtered liquid from the interior of said rotating drum assembly.

2. An apparatus for removing particulate matter from liquids as in claim 1 wherein the first conical end has a drive assembly for attaching to a driving motor, thereby allowing the entire filter body assembly to be rotated.

3. An apparatus for removing particulate matter from liquids as in claim 1 wherein the second conical end is rotatably connected to an outlet.

4. An apparatus for removing particulate matter from liquids as in claim 3 wherein said outlet is fabricated of polyvinyl chloride material.

5. An apparatus for removing particulate matter from liquids as in claim 1 wherein said first conical end has a plurality of vacuum relief ports located above the liquid level.

6. An apparatus for removing particulate matter from liquids as in claim 1 wherein said filter body assembly is canted at an angle in the range of forty to fifty degrees and positioned in liquid with the first conical end above the liquid and the second conical end submerged in the liquid.

7. An apparatus for removing particulate matter from liquids as in claim 1 wherein said filtering means comprises a multi-layered filter assembly.

8. An apparatus for removing particulate matter from liquids as in claim 7 wherein said multi-layered filter assembly further comprises a replaceable guard screen, as an outer layer, a fine screen filter as a second layer, and a coarse metal support screen as an inner layer.

9. An apparatus for removing particulate matter from liquids as in claim 1 wherein said means for removing particulate matter comprises a vacuum head adjustably-mounted and riding said means for filtering.

10. An apparatus for removing particulate matter from liquids as in claim 9 further comprises a vacuum source and separation tank for collecting particulate matter.

11. An apparatus for removing particulate matter from liquids as in claim 1 wherein said means for extracting is a pump assembly having an intake at the lower end of the filter body assembly.

12. An apparatus for removing particulate matter from liquids as in claim 11 wherein said pump assembly further comprises a pump priming mechanism powered by a vacuum produced by said means for removing particulate matter.

13. An apparatus for removing particulate matter from liquids as in claim 1 wherein said means for extracting is a syphon system having an intake at the lower end of the filter body assembly.

14. An apparatus for removing particulate matter from liquids as in claim 13 wherein said system further comprises a syphon-starting device powered by a vacuum produced by said means for removing particulate matter.

* * * * *